United States Patent [19]
Laaser

[11] Patent Number: 6,032,092
[45] Date of Patent: Feb. 29, 2000

[54] CONTROL DEVICE FOR A RESTRAINT DEVICE IN A MOTOR VEHICLE

[75] Inventor: Walter Laaser, Laaber, Germany

[73] Assignee: Siemens Aktiengesellschaft, Munich, Germany

[21] Appl. No.: 08/966,047

[22] Filed: Nov. 7, 1997

[30] Foreign Application Priority Data

Nov. 7, 1996 [DE] Germany ............... 196 45 952

[51] Int. Cl.$^7$ ............... B60R 21/00; G01P 15/00
[52] U.S. Cl. ............... 701/45; 701/34; 340/438
[58] Field of Search ............... 701/45, 46, 34, 701/29; 307/10.1; 280/801.1, 728.1, 734, 735; 340/438

[56] References Cited

U.S. PATENT DOCUMENTS

| | | | |
|---|---|---|---|
| 4,836,024 | 6/1989 | Woehrl et al. | 307/10.1 |
| 4,933,570 | 6/1990 | Swart et al. | 307/10.1 |
| 5,202,831 | 4/1993 | Blackburn et al. | 701/46 |
| 5,357,141 | 10/1994 | Nitschke et al. | 307/10.1 |
| 5,389,822 | 2/1995 | Hora et al. | 307/10.1 |
| 5,544,915 | 8/1996 | Fendt et al. | 280/735 |

FOREIGN PATENT DOCUMENTS

| | | |
|---|---|---|
| 0419455B1 | 4/1991 | European Pat. Off. . |
| 2252414A | 8/1992 | United Kingdom . |

*Primary Examiner*—Michael J. Zanelli
*Attorney, Agent, or Firm*—Herbert L. Lerner; Laurence A. Greenberg

[57] ABSTRACT

A control device for a restraint device in a motor vehicle includes a sensor assembly having at least three acceleration sensors with differently oriented sensitivity axes. An evaluation device ascertains the direction and the intensity of an acceleration acting upon the vehicle from at least two of the acceleration sensors and monitors at least one of the ascertained variables using at least a third one of the acceleration sensors.

9 Claims, 3 Drawing Sheets

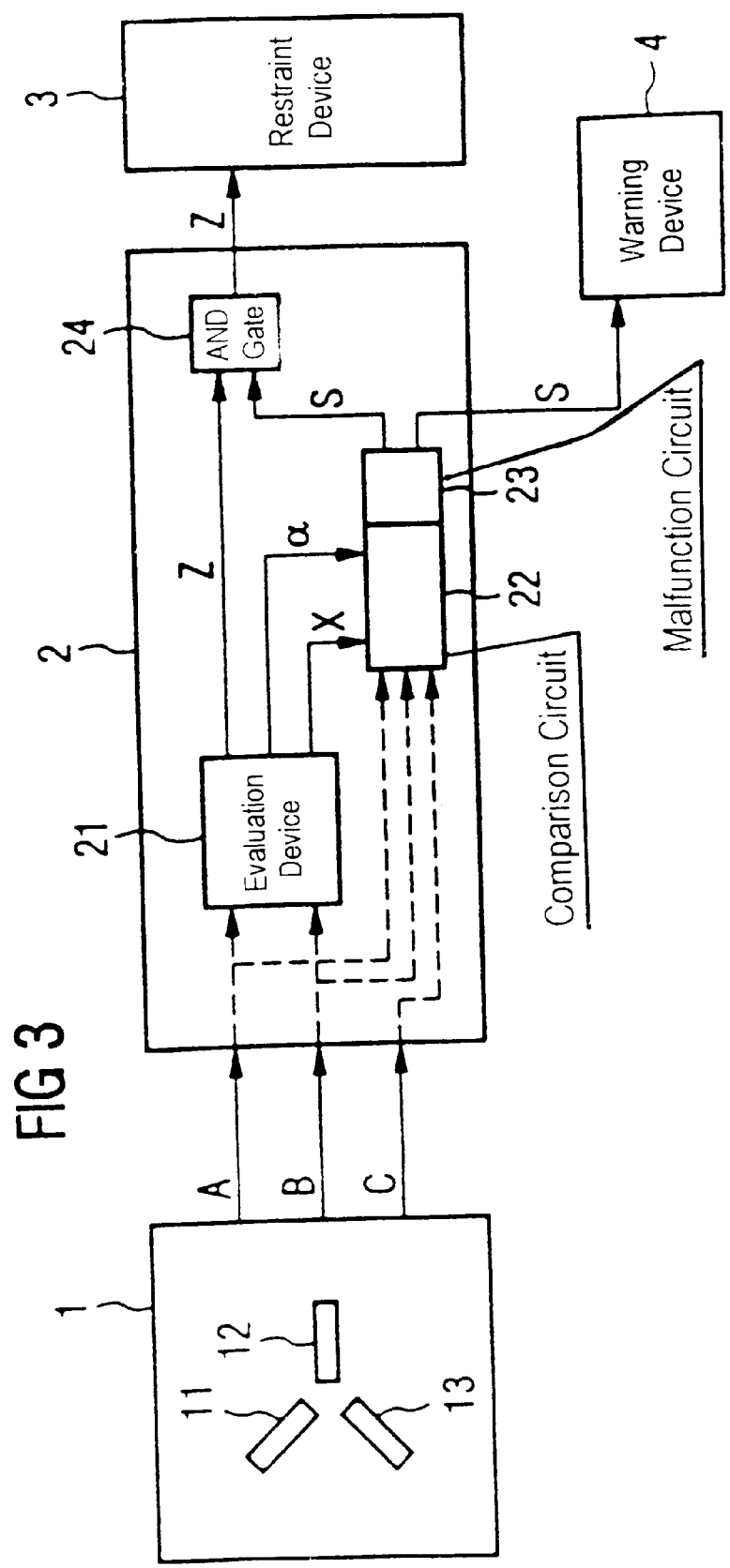

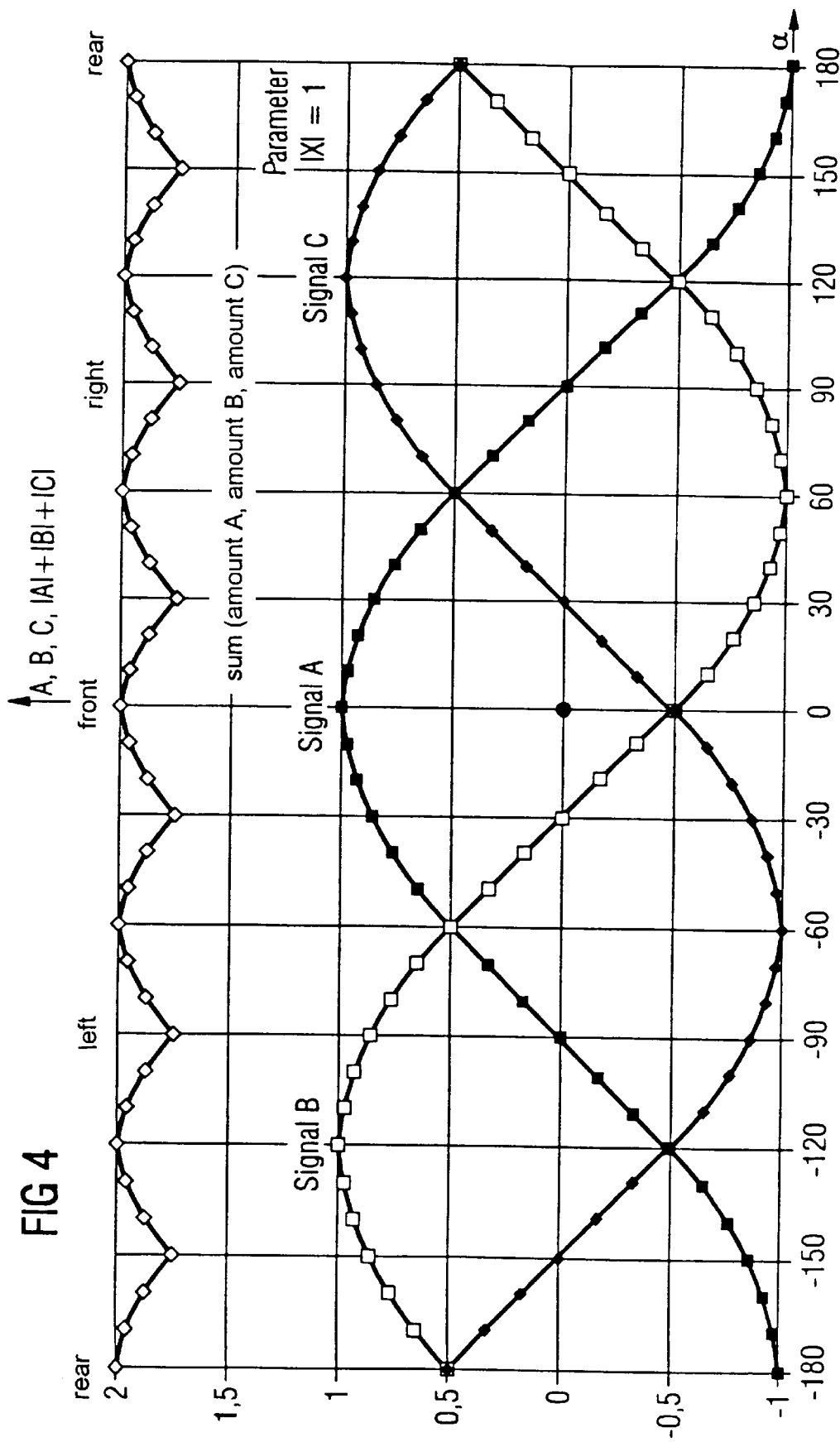

CONTROL DEVICE FOR A RESTRAINT DEVICE IN A MOTOR VEHICLE

BACKGROUND OF THE INVENTION

Field of the Invention

The invention relates to a control device for a restraint device in a motor vehicle, including a sensor assembly having at least three acceleration sensors with differently oriented sensitivity axes in a plane defined approximately by a longitudinal axis of the vehicle and a transverse axis of the vehicle, and an evaluation device for evaluating acceleration signals furnished by the acceleration sensors.

European Patent 0 419 455 B1 discloses a control device for tripping a restraint device in a motor vehicle, in which a sensor assembly furnishes a longitudinal acceleration signal and a crosswise acceleration signal. An evaluation device of the control device generates a tripping signal for the restraint device in dependence on the longitudinal and crosswise acceleration signals, in order to protect against a front-end impact.

U.S. Pat. No. 4,933,570 discloses a control device for tripping a restraint device in a motor vehicle in which a tripping signal for the restraint device is generated as a function of a signal furnished by an acceleration sensor and a switching signal of a mechanical acceleration switch. Such so-called safing sensors, which are constructed as acceleration switches, serve to prevent the tripping of a restraint device if the acceleration sensor or the evaluation device are defective and furnish a tripping signal. Such an acceleration switch in the ignition circuit typically has a low response threshold and thus furnishes a time slot within which tripping can be carried out on the basis of an evaluation of the signals furnished by the acceleration sensor.

In so-called multichannel control devices for passenger protection, that is control devices which have a plurality of differently oriented acceleration sensors, each individual sensor can be assigned one redundant sensor having the properties of a safing sensor, that is a mechanical acceleration switch, for instance. Accordingly in a control device with two channels, four acceleration sensors or switches would be required to enable the failure of one channel to be ascertained. Such a control device with four acceleration sensors is expensive in terms of componentry and requires a large amount of space, because safing sensors as in the past have very large dimensions.

Published UK Patent Application GB 2 252 414 A discloses a control device for a restraint device in a motor vehicle including a sensor assembly having at least three acceleration sensors with differently oriented sensitivity axes in a plane defined approximately by the longitudinal axis of the vehicle and the transversal axis of the vehicle. An evaluation device evaluates the acceleration signals furnished by the acceleration sensors and outputs a tripping signal to the restraint device as a function thereof. Such a control device is advantageous in particular for controlling a passenger protection system that is equipped with driver, passenger and side air bags as restraint devices, because the direction of an impact can be ascertained on the basis of the measured acceleration signals, and the appropriate restraint device can be selected from the restraint devices which are available, in accordance with the direction.

SUMMARY OF THE INVENTION

It is accordingly an object of the invention to provide a multi-channel control device for a passenger protection restraint device in a motor vehicle, which overcomes the hereinafore-mentioned disadvantages of the heretofore-known devices of this general type and which enables a malfunction to be ascertained at little effort or expense.

With the foregoing and other objects in view there is provided, in accordance with the invention, a control device for a restraint device in a motor vehicle having a longitudinal axis and a transverse axis, comprising a sensor assembly having at least three acceleration sensors with differently oriented sensitivity axes in a plane defined approximately by the longitudinal axis and the transverse axis of the vehicle, the at least three acceleration sensors supplying at least first, second and third acceleration signals; and an evaluation device for evaluating the acceleration signals; the evaluation device ascertaining a direction and an intensity of an acceleration acting upon the vehicle from at least the first and second acceleration signals; the evaluation device checking the direction or the intensity using at least the third acceleration signal; and the evaluation device generating a malfunction signal if the direction or the intensity is not confirmed by at least the third acceleration signal.

In accordance with another feature of the invention, the evaluation device ascertains a further directional variable from the third acceleration signal and another one of the acceleration signals; and the evaluation device generates the malfunction signal if the direction and the further directional variable do not approximately agree.

In accordance with a further feature of the invention, there is provided a comparator device ascertaining a further intensity from the third acceleration signal and another one of the acceleration signals; the evaluation device generating the malfunction signal if the intensity and the further intensity do not approximately agree.

In accordance with an added feature of the invention, the evaluation device ascertains a further third acceleration signal from the direction and the intensity; and the evaluation device supplies the malfunction signal if the further third acceleration signal does not approximately agree with the measured third acceleration signal.

In accordance with an additional feature of the invention, the evaluation device associates an angular segment determined as a function of an algebraic sign of the acceleration signals with the acceleration acting upon the vehicle; and the evaluation device supplies the malfunction signal if the direction does not fall within the ascertained angular segment.

In accordance with yet another feature of the invention, the evaluation device determines an estimated intensity of the acceleration as a function of amounts of the acceleration signals; and the evaluation device supplies the malfunction signal if the intensity deviates by more than a defined tolerance value from the estimated intensity.

In accordance with yet a further feature of the invention, the at least three acceleration sensors of the sensor assembly are exactly three sensors disposed at angles of approximately 120° from one another.

In accordance with yet an added feature of the invention, the malfunction signal prevents an output of a tripping signal for tripping the restraint device.

In accordance with a concomitant feature of the invention, there is provided a passenger protection system warning device actuated by the malfunction signal.

Other features which are considered as characteristic for the invention are set forth in the appended claims.

Although the invention is illustrated and described herein as embodied in a control device for a restraint device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a block circuit diagram of the control device of the invention; and

FIG. 4 is a graph which furnishes output signals of acceleration sensors as a function of an impact angle relative to a longitudinal axis of a vehicle, for a sensor assembly disposed in accordance with FIG. 1 and an acceleration of maximum amplitude acting upon the vehicle.

DESCRIPTION OF THE PREFERRED EMBODIMENTS

Figure 1:
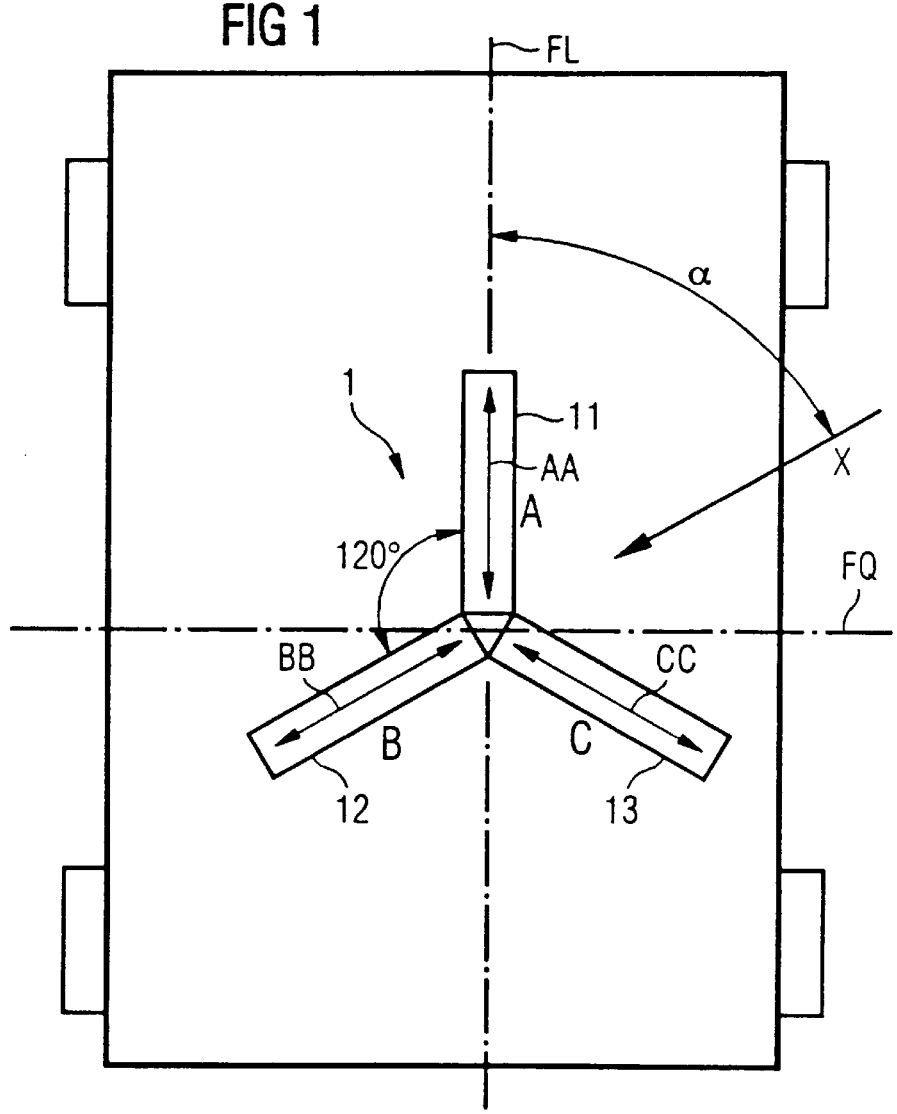
FIG. 1 is a diagrammatic, plan view of a vehicle with a sensor assembly of a control device according to the invention.
Figure 2:
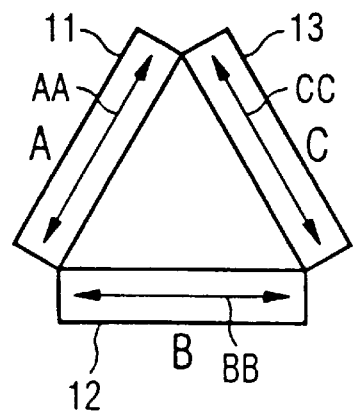
FIG. 2 is an alternative configuration of the sensor assembly, as compared with FIG. 1.

Referring now in detail to the figures of the drawings, in which identical elements and signals are identified by the same reference numerals, and first, particularly, to FIG. 1 thereof, there is seen a symbolically indicated vehicle, in which a longitudinal axis FL of the vehicle and a transversal axis FQ of the vehicle are indicated. A sensor assembly 1 with three analog acceleration sensors 11, 12 and 13 is disposed centrally in the vehicle. The sensors are oriented at an angle of 120° from one another and disposed centrally in the vehicle. Sensitivity axes of the acceleration sensors 11–13 are indicated by reference symbols AA, BB and CC. The acceleration sensor 11 furnishes an acceleration signal A, the acceleration sensor 12 furnishes an acceleration signal B, and the acceleration sensor 13 furnishes an acceleration signal C. Alternatively, the three acceleration sensors 11, 12 and 13 may be oriented as shown in FIG. 2. In either case, the acceleration sensors 11–13 are suitable for recording accelerations in a plane defined by the longitudinal axis FL of the vehicle and the transversal axis FQ of the vehicle and have different sensitivity directions, so that an intensity X and a direction α of an acceleration acting on the vehicle can be calculated from even two of the three acceleration signals A, B, C. The direction α of the incident acceleration is characterized below by an angle α in a predefined plane relative to the longitudinal axis of the vehicle. If more-precise detection of the acceleration acting on the vehicle is necessary, then it is certainly possible for more than three acceleration sensors to be disposed in the sensor assembly 1.

An evaluation device 2 which is shown in FIG. 3 and is preferably constructed as a microprocessor, is used to evaluate the signals A, B, C furnished by the acceleration sensors 11–13 and to output a tripping signal Z to a restraint device 3 as a function of the acceleration signals A, B, C. The restraint device 3 may be con-structed as an airbag or as a belt tensioner. Moreover, if a plurality of restraint devices are present in the motor vehicle, the particular restraint device to be tripped can be selected by the evaluation device 2. The evaluation device 2, together with the sensor assembly 1, can be disposed in a control unit disposed approximately at the center of gravity of the vehicle, or may be spatially separated from the sensor assembly 1.

According to the invention, the direction a and the intensity X of an acceleration acting on the vehicle are calculated from two sensor signals, for instance the acceleration signals A and B. Therefore, equations that express a relationship between the measured acceleration signals A, B and C of the acceleration sensors 11, 12 and 13 of FIG. 1 and the intensity X and the direction α of the incident acceleration (relative to the longitudinal axis FL of the vehicle), read as follows:

$$A = X \cdot \cos(\alpha) \qquad (1.0)$$

$$B = X \cdot \cos(\alpha + 120°) \qquad (2.0)$$

$$C = X \cdot \cos(\alpha + 240°) \qquad (3.0)$$

The direction α at the incident acceleration can be calculated by the following equation from only two acceleration signals, for instance the acceleration signals A and B, through mathematical conversion:

$$\alpha = \tan^{-1}\left(\frac{\left(\frac{B}{A} - \cos(120°)\right)}{\sin(120°)}\right). \qquad (4.0)$$

The intensity X of the acceleration can thus be calculated from equation (1.0) as follows:

$$X = \frac{A}{\cos(\alpha)} \qquad (5.0)$$

Accordingly, through the use of this calculation method, the intensity X and the direction a of the incident acceleration are calculated solely with the aid of the measured acceleration signals A and B of a sensor assembly disposed in accordance with FIG. 1.

It is advantageous, before beginning the calculation, to check that the two acceleration signals used to calculate the direction α and the intensity X have values other than zero, in order to prevent a division by zero. If one of the acceleration signals has the value 0, then some other combination of acceleration signals must be used to calculate the direction α and the intensity X.

These calculations are carried out, for instance, in an evaluation circuit 21 of the evaluation device 2. The evaluation circuit 21 will decide on the basis of the calculated direction α and the calculated intensity X, whether or not one of the restraint devices 3 should be tripped, and if so which of the restraint devices 3 should be tripped. A corresponding tripping signal Z is sent to an AND gate 24 of the evaluation device 2, as is shown in FIG. 3.

Either the intensity X, the direction α or both variables α, X of the acceleration acting on the vehicle are then checked in a comparison circuit 22 of the evaluation device 2, through the use of the measured acceleration signal that was so far not used to calculate the direction α and the intensity X, in this case the third acceleration signal C. This checking of at least one of the calculated variables α or X serves to make any tripping of the restraint device 3 more reliable and in particular to enable checking of the output signals of the acceleration sensors 11–13. For example, a further directional variable α' may be obtained, analogously to equation (4.0), from two acceleration signals which have not been used in this combination to calculate the direction α using equation (4.0). For instance, the further directional variable α' may be ascertained from the acceleration signals B and C, or the acceleration signals A and C. The further directional variable α' is thereupon compared with the direction α in the comparison circuit 22. If the two calculated directional variables α' and α deviate considerably from one another, then it is extremely likely that some malfunction in the sensor assembly 1 or the evaluation device 2 is involved, so that a malfunction signal S is generated by a malfunction circuit 23 of the evaluation device 2. The malfunction signal S can actuate a warning device 4, by which a passenger of the vehicle is warned of a defect in the passenger protection system. The malfunction signal S preferably also prevents a tripping signal Z generated by the evaluation circuit 21 from being passed on to the restraint device 3 and thus prevents tripping of the restraint device 3. To that end, the tripping signal Z and the malfunction signal S are configured in such a way that the tripping signal Z is delivered to the restraint device 3 through the AND gate 24 only whenever a tripping demand on the part of the evaluation circuit 21 is present and at the same time no malfunction is detected by the malfunction circuit 23.

As an alternative to calculating a further directional variable α', a further intensity X' can be ascertained in the same way, using a combination of acceleration signals not used in calculating the intensity X. If the further intensity X' and the intensity X do not agree, then the malfunction signal S is generated by the malfunction circuit 23.

As an alternative, a further third acceleration signal C' can be calculated in the comparison circuit 22 with the aid of the variables X and α calculated as a function of the acceleration signals A and B, by inserting X and a into equation (3.0) and furnishing a further third acceleration signal C' as a result. In this way, the calculated third acceleration signal C' can be compared with the measured third acceleration signal C, and if they differ the malfunction signal S is generated.

If there is only little computational capacity available, or if short computation times for checking the sensor signals are to be attained, then the following procedure for conversion of a safing function is especially advantageous: An angular segment α_i is ascertained from the algebraic sign of the sensor signals A, B, C which are furnished. For example, the sensor 11 in FIG. 1 furnishes an acceleration signal with a positive sign in the case of a front impact and an acceleration signal A with a negative sign in the case of a rear-end collision. If the exactly calculated direction a falls within the estimated angular segment α_i, then the outputting of the malfunction signal S is omitted. An association of all of the sign combinations with angular segments can be taken from the following table:

$A>0; B<0; C<0 \Rightarrow \alpha\_1: -30° \text{ to } +30°$ $A>0; B>0; C<0 \Rightarrow \alpha\_2: -30° \text{ to } -90°$ $A<0; B>0; C<0 \Rightarrow \alpha\_3: -90° \text{ to } -150°$ $A<0; B>0; C>0 \Rightarrow \alpha\_4: -150° \text{ to } +150°$ $A<0; B<0; C>0 \Rightarrow \alpha\_5: +150° \text{ to } +90°$ $A>0; B<0; C>0 \Rightarrow \alpha\_6: +90° \text{ to } +30°$ This association can also be taken from the graph in FIG. 4. In it, the acceleration signals A, B, C are plotted over the direction α of the incident acceleration relative to the longitudinal axis FL of the vehicle. In each case, an impact of maximum intensity |X|=1 is assumed.

As an alternative or in addition, an estimated intensity X__ can be ascertained by a simple calculation step solely from the amounts of the furnished acceleration signals A, B and C. The estimated intensity X__ is obtained from the following equation:

$$X\_\_ = \frac{(|A| = |B| + |C|)}{2} \qquad (6.0)$$

The estimated intensity X__ must not deviate by more than up to Δ=13% from the calculated intensity X of the acceleration acting on the vehicle. If the estimated intensity X__ is outside the tolerance range X±Δ, then the malfunction signal S is generated. The summation signal from the various amounts of the acceleration signals A, B and C over the impact angle α for a maximum incident acceleration intensity |X|=1 can be seen from FIG. 4.

Two acceleration sensors are at least required in order to ascertain the direction and intensity of an incident acceleration. The redundant embodiment of sensors as a safing function that was previously usual would require four sensors. However, according to the invention, only three sensors are needed to produce a guard function for the tripping system. Accordingly, in the control device with three sensors according to the invention, at least one sensor can be dispensed with.

I claim:

1. In a motor vehicle having a longitudinal axis, a transverse axis and a restraint device, a control device for the restraint device, comprising:

a sensor assembly having at least three acceleration sensors with differently oriented sensitivity axes in a plane defined approximately by the longitudinal axis and the transverse axis of the vehicle, said at least three acceleration sensors supplying at least first, second and third acceleration signals; and an evaluation device for evaluating the acceleration signals;

said evaluation device ascertaining a direction and an intensity of an acceleration acting upon the vehicle from at least the first and second acceleration signals;

said evaluation device checking one of the direction and the intensity using at least the third acceleration signal; and said evaluation device generating a malfunction signal if one of the direction and the intensity is not confirmed by at least the third acceleration signal.

2. The control device according to claim 1, wherein said evaluation device ascertains a further directional variable from the third acceleration signal and another one of the acceleration signals; and said evaluation device generates the malfunction signal if the direction and the further directional variable do not approximately agree.

3. The control device according to claim 1, including a comparator device ascertaining a further intensity from the third acceleration signal and another one of the acceleration signals; said evaluation device generating the malfunction signal if the intensity and the further intensity do not approximately agree.

4. The control device according to claim 1, wherein said evaluation device ascertains a further third acceleration signal from the direction and the intensity; and said evaluation device supplies the malfunction signal if the further third acceleration signal does not approximately agree with the measured third acceleration signal.

5. The control device according to claim 1, wherein said evaluation device associates an angular segment determined as a function of an algebraic sign of the acceleration signals with the acceleration acting upon the vehicle; and said evaluation device supplies the malfunction signal if the direction does not fall within the ascertained angular segment.

6. The control device according to claim 1, wherein said evaluation device determines an estimated intensity of the acceleration as a function of amounts of the acceleration signals; and said evaluation device supplies the malfunction signal if the intensity deviates by more than a defined tolerance value from the estimated intensity.

7. The control device according to claim 1, wherein said at least three acceleration sensors of said sensor assembly are exactly three sensors disposed at angles of approximately 120° from one another.

8. The control device according to claim 1, wherein the malfunction signal prevents an output of a tripping signal for tripping the restraint device.

9. The control device according to claim 1, including a passenger protection system warning device actuated by the malfunction signal.

* * * * *